United States Patent [19]

Hirai et al.

[11] Patent Number: 4,769,704
[45] Date of Patent: Sep. 6, 1988

[54] SYNCHRONIZATION SIGNAL GENERATOR

[75] Inventors: Kiyoshi Hirai, Neyagawa; Takeshi Morimoto, Osaka; Kunio Sekimoto, Katano, all of Japan

[73] Assignee: Matsushita Electric Industrial Co., Ltd., Kadoma, Japan

[21] Appl. No.: 870,142

[22] Filed: Jun. 3, 1986

[30] Foreign Application Priority Data

Jun. 4, 1985 [JP] Japan .............................. 60-120935
Jun. 10, 1985 [JP] Japan .............................. 60-125334
Nov. 20, 1985 [JP] Japan .............................. 60-260089

[51] Int. Cl.$^4$ ..................... H04N 5/04; H04N 5/06
[52] U.S. Cl. ................................ 358/148; 358/150; 358/153; 358/158; 358/319; 331/20
[58] Field of Search ............... 358/17, 18, 148, 149, 358/150, 158, 319, 320, 337; 331/20

[56] References Cited

U.S. PATENT DOCUMENTS 3,549,792 12/1970 Barclay ........................... 358/150
4,122,488 10/1978 Mikado ........................... 358/158
4,617,594 10/1986 Katagiri et al. ................. 358/150

FOREIGN PATENT DOCUMENTS 115775 9/1980 Japan ................................ 358/150

Primary Examiner—James J. Groody
Assistant Examiner—Michael D. Parker
Attorney, Agent, or Firm—Cushman, Darby & Cushman

[57] ABSTRACT

A synchronization signal generator for NTSC, PAL or PALM system, capable of synchronizing by external signal; wherein horizontal information signal of external synchronization signal is processed through a stabilization circuit, and its output is frequency-divided by a counter, and then only such horizontal scanning information parts that makes phase relation of the horizontal synchronization signal and the color sub-carrier to a predetermined relation is extracted, and by resetting the counter based on the extracted information, to obtain SCH phase regulated signal.

6 Claims, 4 Drawing Sheets

SYNCHRONIZATION SIGNAL GENERATOR

FIELD OF THE INVENTION AND RELATED ART STATEMENT

1. FIELD OF THE INVENTION

The present invention relates generally to a synchronization signal generator, and particularly to a synchronization signal generator which is for producing synchronization signal of a standard system, such as NTSC system, PAL system or the like, and is capable of being synchronized by external synchronization signal.

2. DESCRIPTION OF THE RELATED ART

A synchronization signal generator for producing various kinds of synchronization signal by dividing an original oscillation frequency is utilized in video tape recorders (hereinafter VTR) or VTR editors or the like apparatus. For instance, in a synchronization signal generator of NTSC system, in general, a frequency of four times of color sub-carrier frequency $f_{SC}$ is used, and therefrom various signals, such as color sub-carrier $f_{SC}$, horizontal synchronization signal, vertical synchronization signal, etc. are produced.

Since the operations of plural frequency dividers in a synchronization signal generator at the instance of switching on of the power switch differs from each other, phase relations among various signals, namely horizontal synchronization signal, vertical synchronization signal, color sub-carrier, etc. are not constant.

Furthermore, in recent years, demand for phase control among the phases of color sub-carrier $S_C$ and the horizontal synchronization signal H for avoiding jumping of color sub-carrier to be generated in VTR editing or in multiple signal switching becomes great. For instance, in the Japanese un-examined published patent application No. Sho 55-86278, resetting of ¼ frequency divider to produce color sub-carrier $f_{SC}$ from the original frequency 4 $f_C$ is made by a signal based on a horizontal synchronization signal which is an output of a synchronization signal generator.

Though the above-mentioned disclosed method can regulate the phase relation between the color sub-carrier $S_C$ and the horizontal synchronization signal H (hereafter is referred to as SCH relation) within one apparatus, such as a VTR is obtainable, agreement of phases between color sub-carrier contained in external synchronization signal and a color sub-carrier produced from the synchronization signal generator within an apparatus at the switching on of the power switch, is not necessarily obtainable. Moreover, when the external synchronization signal varies, the output changes by receiving the influence thereof; and when the external synchronization signal is absent, in order to switch the synchronization to the internal synchronization, a detection becomes necessary for the presence of the external synchronization signal. The conventional detection circuits for detection of the presence or absence of the synchronization signal is mostly of re-triggerable analog type monostable-multi vibrator. Such monostable-multi vibrator detects the presence of the signal by selecting the longer pulse width of the monostable-multi vibrator than the period of the signal to be detected, thereby making the incoming signal trigger the monostable-multi vibrator by edges of the waves of the incoming signal. Thus, a High level at Q output of the monostable-multi vibrator is produced; whereas at the absence of the incoming signal, hence absence of the triggering, the Q output is retained at Low level. The above-mentioned conventional detection of the external synchronization signal by using the analog type monostable-multi vibrator, however, has a difficulty in realizing on an LSI in digital operation. Furthermore, the above-mentioned conventional method has a problem of false outputting of the detection signal when a noise comes in the absence of the signal, operating the detection circuit and outputs detection signal for a certain time period.

As has been elucidated, when the conventional synchronization signal generator is synchronized by the external synchronization signal, at the instant of the switching on of the power source, the phases of the color sub-carrier contained in the externzal synchronization signal and the color sub-carrier produced by the synchronization signal generator do not necessarily agree each other; and when the external synchronization signal varies, the apparatus receives influence of the variation, thereby to produce undesirable change of the synchronization signal. Furthermore, the conventional synchronization signal generator has the shortcoming of weakness against noise at the absence of the external synchronization signal, thbereby to varies output.

OBJECT AND SUMMARY OF THE INVENTION

The present invention purposes, in view of the above-mentioned problem in the prior art, to provide a synchronization signal generator capable of coinciding of phase of color sub-carrier with the external synchronization signal, thereby to enable SCH phase regulation when an external synchronization operation is selected, and obtaining stable synchronization signal even when noise or the like undesirable input comes in the input terminal for receiving the external synchronization signal when the apparatus once is switched for operation with internal synchronization.

The synchronization signal generator in accordance with the present invention comprises:

an oscillator having an oscillation frequency of an integer times color sub-carrier frequency.

synchronizing means for making the oscillator synchronize with an external sub-carrier of an external reference signal, at least one counter for dividing output signal of the oscillator, to produce horizontal and vertical synchronization signals and a horizozntal information signal, a window pulse generator for producing a window pulse for detecting frequency deviation of the external reference signal exceeding a predetermined level, and reset means for resetting the counter.

According the above-mentioned configuration, when deviation of signal of horizontal information extracted from the external synchronization signal is limited within a certain time period when the operation is selected for the external synchronization, a stable synchronization signal can be generated without receiving the influence of the deviation of the frequency of the horizontal signal information.

Further, a synchronization signal generator in accordance with the present invention comprises:

an oscillator having an oscillation frequency of an integer times color sub-carrier frequency, synchronizing means for making the oscillator synchronize with an external sub-carrier of an external reference signal, at least one counter for dividing output signal of the oscillator, to produce horizontal and vertical synchronization signals and a horizontal information signal, a window pulse generator for producing a window pulse for detecting frequency deviation of the external reference signal exceeding a predetermined level, reset means for producing reset pulses to reset the counter being based on the horizontal information signal extracted from the external reference signal, reset pulse selection means for selecting among many reset pulses such a reset pulse of a horizontal line that has a predetermined phase relation between phase of the color sub-carrier issued by the counter and the horizontal synchronization signal, and a normalization circuit for normalizing timing of the reset pulse selected by the reset pulse selection means, to have a relation with the phase of the color sub-carrier issued by the counter, subsequently to reset the counter.

According to the above-mentioned configuration, a satisfactory coincidence of color sub-carrier phase with the external synchronization is made, and good SCH phase regulation becomes possible.

Still furthermore, a synchronization signal generator in accordance with the present invention comprises:

an oscillator having an oscillation frequency of an integer times color sub-carrier frequency, synchronizing means for making the oscillator synchronize with an external sub-carrier of an external reference signal, at least one counter for dividing output signal of the oscillator, to produce horizontal and vertical synchronization signals and a horizontal information signal, a window pulse generator for producing a window pulse for detecting frequency deviation of the external reference signal exceeding a predetermined level, detection means for detecting a continuity of state of the horizontal information signal being outside the window pulse for over a predetermined time period, and reset means for resetting the counter when the detection means detects the continuity, being based on the horizontal information signal extracted from the external reference signal.

According to the above-mentioned configuration, in the operation of external synchronization, even when the external synchronization signal frequency deviates at one time or intermittently by external noise for a period exceeding the above-mentioned certain time period, a stable synchronization signal is generated without making a necessary response to the external noise for said certain time period.

Still furthermore, a synchronization signal generator in accordance with the present invention comprises:

an oscillator having an oscillation frequency of an integer times color sub-carrier frequency, synchronizing means for making the oscillator synchronize with an external sub-carrier of an external reference signal, at least one counter for dividing output signal of the oscillator, to produce horizontal and vertical synchronization signals and a horizontal information signal, a window pulse generator for producing a window pulse for detecting frequency deviation of the external reference signal exceeding a predetermined level, reset means for resetting the counter, and a signal detector which comprises a pulse width signal generator for producing a pulse having a width of a predetermined time length from a front edge of a synchronization signal detected thereby, a delay circuit for delaying output of the pulse width signal generator, and a signal absence detector which compares states of plural outputs of the delay circuit thereby to detect presence or absence of signal and issue a signal-absence signal to the synchronizing means, thereby to stop the synchronization operation thereof.

According to the above-mentioned configuration, even when the external synchronization signal contains a serious noise or signal defect, stable synchronization signal can be generated.

DESCRIPTION OF PREFERRED EMBODIMENTS

Figure 1:
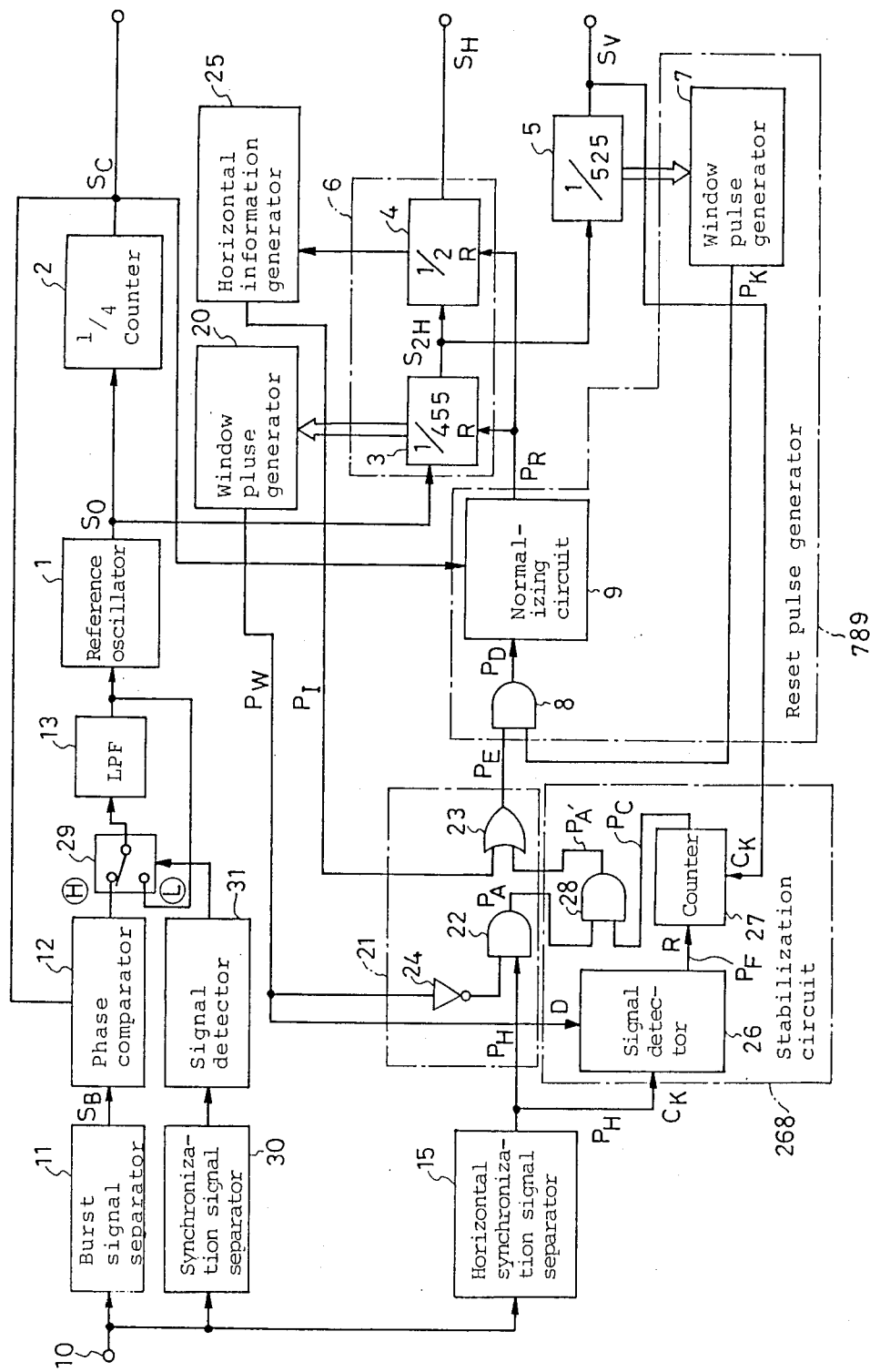
FIG. 1 is a circuit block diagram of a synchronization signal generator embodying the present invention.

A first preferred embodiment in accordance with the present invention is elucidated with reference to its circuit block diagram shown in FIG. 1 and waveforms of various parts showing the operation of the circuit of FIG. 1.

The circuit of FIG. 1 is of a synchronization signal generator capable of operating with external synchronization by external reference signal, and of an NTSC system synchronization signal generator. In FIG. 1, a reference oscillator 1 is constituted by a voltage-controlled variable frequency oscillator, and its oscillation frequency (reference frequency) is selected as $4f_{SC}$, namely four times of color sub-carrier frequency. Output $S_O$ of the reference oscillator 1 is given to a counter 2 which serves as ¼ frequency divider to produce a color sub-carrier $S_C$ of frequency $f_{SC}$. The output $S_O$ is further given to a counter 3 which divides the frequency of $4f_{SC}$ to 1/455, thereby to produce a frequency-divided signal $S_{2H}$ which has a frequency of twice the horizontal synchronization frequency $f_H$. The frequency divided output $S_{2H}$ is further given to a ½ counter 4 and produce a horizontal synchronization signal $S_H$, and further given to a 1/525 counter 5 which produces vertical synchronization signal $S_V$. That is, the counters 3 and 4 constitute a horizontal counter 6.

An input terminal 10 for receiving external reference signal receives output reference signal, which is usually an ordinary color video signal. The external reference signal is given to a burst signal separator 11, whereby burst signal $S_B$ is separated. The burst signal $S_B$ and the color sub-carrier $S_C$ from the ¼ counter 2 are given to a phase comparator 12, which issues phase comparison output, through a switch 29 and a low pass filter 13, to the reference oscillator 1 as its control voltage. Thereby, frequency and phase of the reference signal $S_O$ is synchronized to the frequency and phase of the external burst signal $S_B$.

On the contrary, when the external reference signal is not given to the input terminal 10, the output of the signal detector 31 becomes Low and hence the switch 29 is turned to L-side. Accordingly, the reference oscillator 1 is switched to self-oscillation operation. Details of the signal detector 31 is described later.

On the other hand, in order to make synchronizations of the phases of the horizontal synchronization signal $S_H$ from the counter 4 and the vertical synchronization signal $S_V$ from the counter 5 to the phases of external horizontal synchronization signal, a horizontal synchronization signal $P_H$ separated from the external reference signal by a horizontal synchronization signal separator 15 is given to and processed by the below-mentioned circuits and the processed signal is given to a reset terminal of the horizontal counter 6.

In general, the horizontal synchronization signal $P_H$ contains jitter component owing to instability of horizontal synchronization signal separator 15. Therefore, by using the reset pulse controlling circuit 21 or the like, fluctuation of the horizontal synchronization signal of only above a certain level is normally detected and processed for use for phase regulation.

The reset pulse control circuit 21 receives outputs from a first window pulse generator 20 and a horizontal information generator 25. The first window pulse generator 20 makes pulse having a pulse width for several clock signals of the reference signal $S_O$ and contains next horizontal synchronization signal $P_H$.

The reset pulse control circuit 21 consists of an AND circuit 22 and an OR circuit 23, and external horizontal synchronization signal $P_H$ is given to the AND circuit 22. And a signal of phase inverted output of the above-mentioned window pulse $P_W$ is utilized as gate signal therefor. The inversion is made by an inverter 24. The horizontal information generator 25 produces information having horizontal scanning frequency information by utilizing output of the counter 4 and the horizontal information $P_I$, and output $P_A$ of the AND circuit 22 through the AND circuit 28 are given to the OR circuit 23.

When the above-mentioned various pulses are handled as positive logic, the time period when the AND circuit 22 issues output is the time period when the horizontal synchronization signal $P_H$ exists in the outside area of the first window pulse $P_W$; and usually output $P_A$ of the AND circuit 22 is in Low level, since the horizontal synchronization signal $P_H$ exists within the time period of the width of the first window pulse $P_W$. That is, as the output $P_E$ of the OR circuit 23, the horizontal information signal $P_I$ itself is issued, and the horizontal counter becomes the state of internal resetting. The reset pulse control circuit 21 operates not to accept jitter of the horizontal synchronization signal $P_H$ within the range of pulse width of the first window pulse $P_W$; and if the phase fluctuation is large, the horizontal counter 6 is reset by the external horizontal synchronization signal $P_H$ when input signal (i.e., $P_C$) to the AND circuit 28, which is other than the signal $P_A$, becomes High level.

Next, operation of the reset pulse generator 789 is elucidated. This circuit is constituted by a second window pulse generator 7, a gate circuit 8 and a normalization circuit 9. The second window pulse generator 7 receives output of the counter 5 serving as a frequency divider of vertical counter of the synchronization signal generator, and issues a second window pulse $P_K$. The second window pulse $P_K$ is such one as to select a horizontal line whereon phase relations of color sub-carrier $S_C$ and the horizontal synchronization signal $P_H$ coincides. For instance, in case of NTSC system, the second window pulse $P_K$ is such that it selects output $P_E$ from the pulse control circuit 21 for every other horizontal lines, since the color sub-carrier $S_C$ turns one round after lapse of time period of every two horizontal scanning lines and positional relation to the horizontal synchronization signal $P_H$ turns to the same state. The above-mentioned cycle of issuing window pulse $P_K$ is not necessarily two line cycle, but may be 2n line cycle.

The gate circuit 8 is an AND circuit which select only horizontal lines whereon the second window pulse $P_K$ is generated among many output pulses $P_E$ of the reset pulse control circuit 21.

The normalization circuit 9 is composed of a flip-flop or the like circuit, which by latching the output $P_D$ of the gate circuit 8 by color sub-carrier $S_C$ issues a reset pulse $P_R$, thereby to normalize phase of reset signal to the horizontal counter 6 so as to become the position of edge of the color sub-carrier.

By means of this normalizing circuit 9, phase relation of the horizontal and vertical synchronization signals and color sub-carrier are accurately defined, thereby always retaining the SCH relation.

By the way, in PALM system, since the color sub-carrier is ¼ line offset, after lapse of time period of every four lines period the phase relation turns one cycle. Therefore, the aforementioned window pulse $P_K$ must be window pulses of every 4n line cycle.

On the other hand, in case of PAL system, the relation among the color sub-carrier $f_{SC}$, horizontal frequency $f_H$ and vertical frequency $f_V$ is given as:

$$f_{SC} = \frac{1135}{4} f_H + \frac{1}{2} f_V \text{ and } f_H = \frac{625}{2} f_V.$$

Therefore, the phase relation of the color sub-carrier makes one cycle for every 8 fields (namely, in the frequency of $f_V/8$). Hence, the second window pulse $P_K$ selects one horizontal information at every 8 fields.

Figure 2:
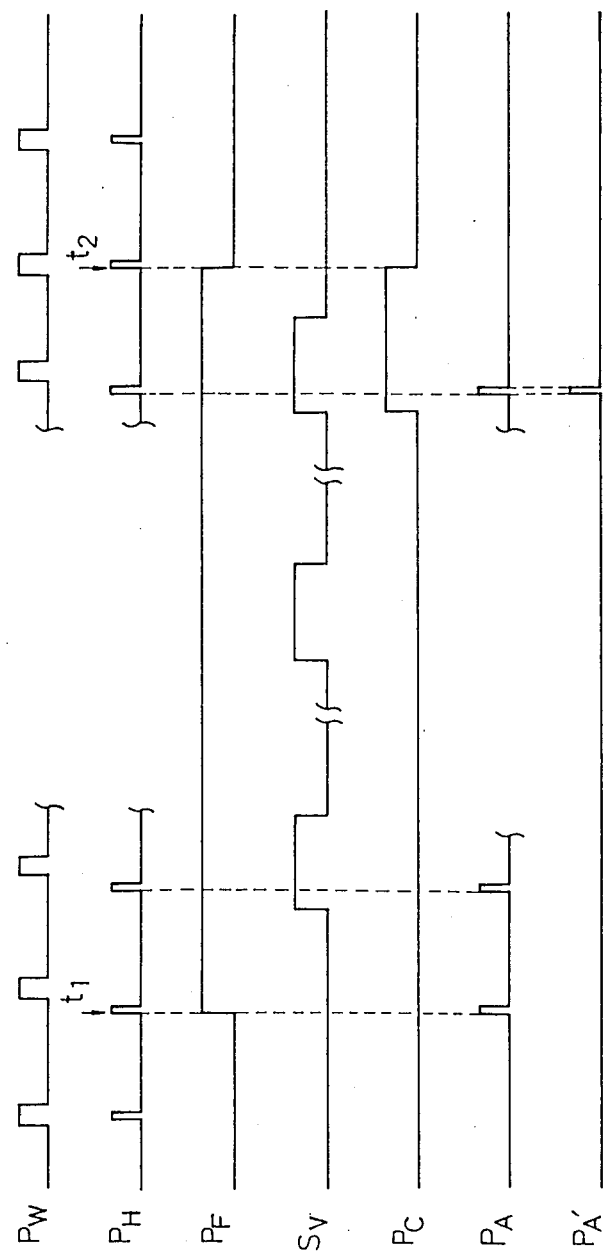
FIG. 2 is a waveform chart of the waveform of various parts of the circuit of FIG. 1.

Next, elucidation is made on stabilization circuit of the synchronization signal output. The stabilization circuit comprises a signal detector 26 which receives output signal from the horizontal synchronization signal separator 15 and a counter 27 which receives output from the signal detector 26 and an AND circuit 28. As above-mentioned, the output signal $P_A$ of the AND circuit 22 does not appear when fluctuation of the external synchronization signal $P_H$ is within pulse width of output the pulse $P_W$ of the first window pulse generator 20. However, if the external synchronization signal $P_H$ fluctuates to outside of the pulse width of the first window pulse $P_W$ either once or repeatingly, the AND circuit 22 issues output $P_A$. In such situation, when the other input of the AND circuit 28 is at High level, the AND circuit 22 issues a reset signal through the OR circuit 23, the AND circuit 8 and the normalization circuit 9, to the counters 3 and 4, thereby to reset them. Accordingly, the output of the counter 4 is influenced. According to the present invention, the detection circuit 26 detects whether the external synchronization signal $P_H$ lies within the width of the first window pulse $P_W$ or not, and issues output signal $P_F$. The detection circuit 26 consists of, for instance, D-type flip-flop which receives the external synchronization signal $P_H$ as its clock signal and the first window pulse $P_W$ as its data signal, and $\overline{Q}$ output of the D-type flip-flop is issued as its output $P_F$. According to such configuration, as shown in FIG. 2, the output signal $P_F$ of the signal detector 26 becomes Low when the external synchronization signal $P_H$ is within the pulse width of the first window pulse $P_W$, and High when the external synchronization signal $P_H$ is outside the width of the first window pulse $P_W$. The output $P_F$ of the signal detector 26 makes the counter 27 reset. The counter 27 counts $S_V$ from the point of time $t_1$ of FIG. 2 when the signal $P_F$ turns High. When the count time is set, for instance, for the time period for 30 field (=0.5 sec; this means counting of, for instance, 30 vertical synchronization signal $S_V$). Then if the output $P_F$ remains high (the external synchronization signal $P_H$ is retained outside of the width of $P_W$), within about 0.5 sec from the point of time $t_1$, namely within 30 $S_V$ the output signal $P_C$ of the counter 27 turns to High level. If the external synchronization signal $P_H$ comes within the pulse width of the first window pulse $P_W$ even only once, then the output $P_F$ of the signal detector 26 immediately turns to low, and the counting re-starts from the point of time when the signal $P_H$ goes out the first window pulse $P_W$. That is, the signal $P_C$ represents a period during which the external synchronization signal $P_H$ is outside the first window pulse $P_W$. The signal $P_C$ of the counter 27 and the signal $P_A$ of the AND circuit 22 are lead to the AND circuit 28, which produces output signal $P_A'$ when both inputs are at High level. The signal $P_A'$ appears only when the external synchronization signal $P_H$ is continuingly outside the period of the first window pulse $P_W$ for a certain time period, and this signal $P_A'$ resets the counters 3 and 4. When the counters 3 and 4 are reset by this pulse, the output of the counters 3 and 4 are regulated by the first window pulse $P_W$, and output $P_W$ of the first window pulse generator 20 is moved to the position which includes the external synchronization signal $P_H$. From this point of time ($t_2$ of FIG. 2) on, the signals $P_A$ and $P_C$ turns to Low level, and retains a new stabilized state. In this way even when the external synchronization signal $P_H$ temporarily changes greatly, if the change is limited within a predetermined time period, the counters 3 and 4 receive no serious influence, and stable output is obtainable. On the other hand, when the power source is on, the stable state is obtainable within the afore-mentioned predetermined time period. Furthermore, the counters 3 and 4 can issue stable output within the predetermined time period without serious influence, also in case when the external synchronization signal $P_H$ is shifted with respect to the external reference signal 10 to change relative position of the outputted horizontal synchronization signal, vertical synchronization signal and external reference signal.

Figure 3:
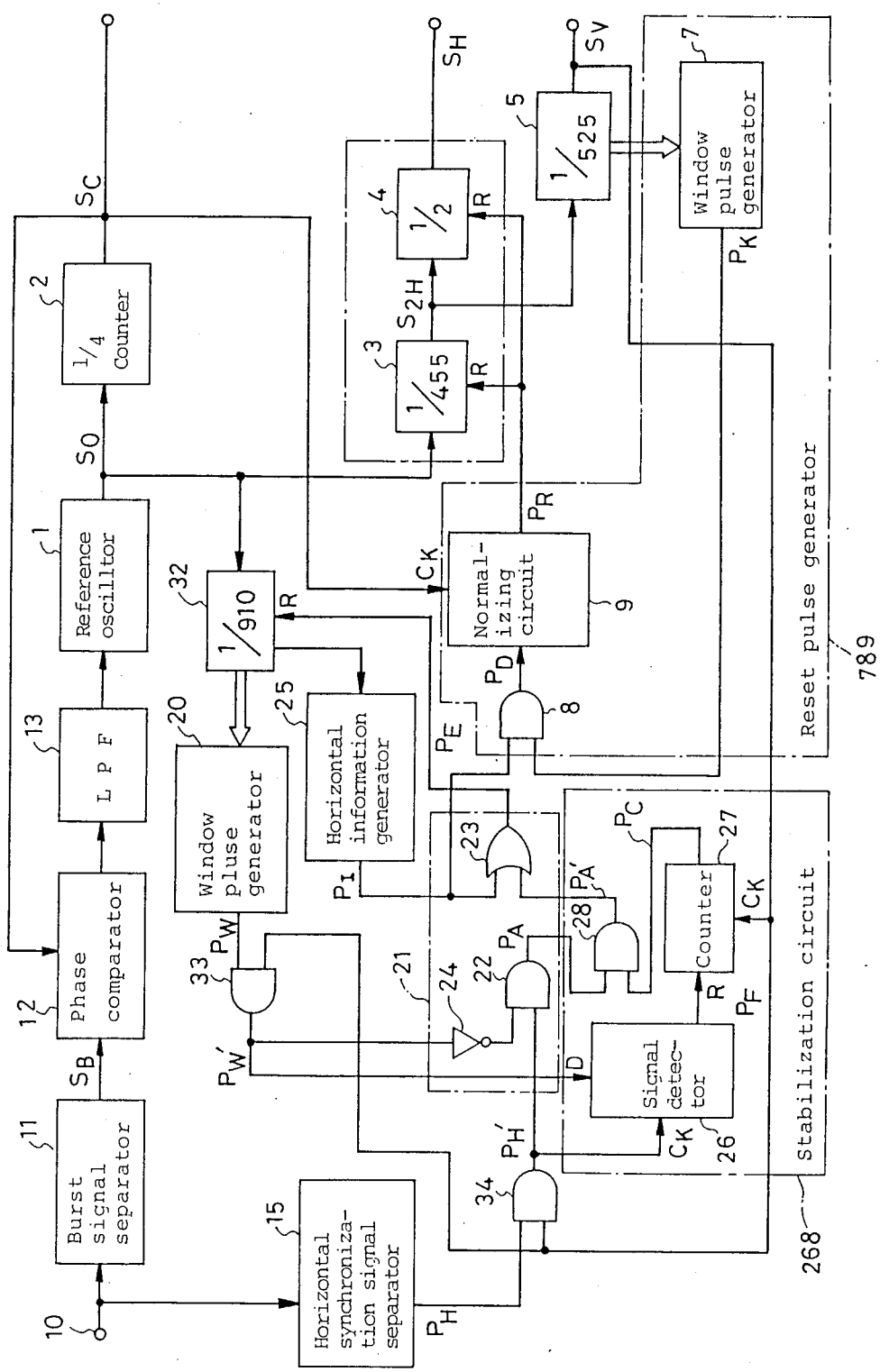
FIG. 3 is a circuit block diagram of another synchronization signal generator embodying the present invention.

FIG. 3 is a block diagram showing another embodiment of NTSC type synchronization signal generator embodying the present invention. The same or corresponding parts and components to the first embodiment shown in FIG. 1 are designated by the same numerals, and the elucidation therefor is omitted, since the same applies thereto and the corresponding parts make the same functions. Apart from the first embodiment wherein the window pulse $P_W$ and horizontal information $P_I$ are made by counters 3 and 4 to produce the horizontal synchronization signal $S_H$, the embodiment of FIG. 3 has a separately provided counter 32. This separately provided counter 32 is reset by output signal of an OR circuit 23 which receives signal $P_A'$ of AND circuit 28 and output signal of the horizontal information generator 25. The signal $P_A'$ is in Low level in normal state like the case of FIG. 1, hence resetting the counter 32. From the horizontal information signal $P_I$, information component $P_D$ which has a certain phase relation with color sub-carrier is extracted by AND circuit 8, and the output is normalized by normalizing circuit 9 with respect to phase of color sub-carrier to produce normalized signal $P_R$. And the output resets the counters 3 and 4, thereby to produce a horizontal synchronization signal $S_H$, and to retain the SCH relation similar as the case of FIG. 1.

Operation with respect to the external synchronization signal $P_H$ is the same as the case of FIG. 1, but in the configuration of FIG. 3 two AND circuits 33 and 34 are provided, and thereby the first window pulse $P_W$ and the external synchronization signal $P_H$ are extracted every fields, thereby to produce output signal $P_W'$ and $P_H'$, respectively. Therefore, the operation of this embodiment is the same as that of the circuit of FIG. 2, when the description of the operation is read by converting the signals $P_W$ and $P_H$ of FIG. 2 into $P_W'$ and $P_H'$ of FIG. 3, respectively.

Apart from the NTSC system, the signal $S_O$ and $P_H$ are not in integer ratio relation in PAL system, that is, they are in the relation of $4f_{SC}=1135f_H+2f_V$.

The above-mentioned integer ratio relation is obtainable by making as, a circuit which normally divides input signal to 1/1135 frequency, and only twice in one field they divides input signal to 1/1136 frequency, thereby, the PAL system signal is obtainable. At that time, since the output $S_H$ is not the signal of fully equivalent pitch, by utilizing another PLL circuit, a complete horizontal synchronization signal is formed. In such signal, the first window pulse $P_W$ and the external synchronization signal $P_H$ fully coincide at least on one horizontal line in every one field, but in other lines of the field the synchronization differs little by little (maximum difference is a period for two clock pulses of the output signal $S_O$ of the reference oscillator). As shown in FIG. 3, by providing the AND circuits 33 and 34, the extraction can be made only at the time positions $P_W'$ and $P_H'$ at which phase of the signals $P_W$ and $P_H$ coincides.

The above-mentioned provision of the counters for producing the first window pulse $P_W$ and the horizontal information $P_I$ separately from each other, circuit loops for producing the horizontal synchronization signal $S_H$ and the reset control loop are separated, and therefore more stable operation is obtainable. The present invention is also effective for a synchronization signal generator for producing a signal which is synchronized only to the external synchronization signal.

Figure 4:
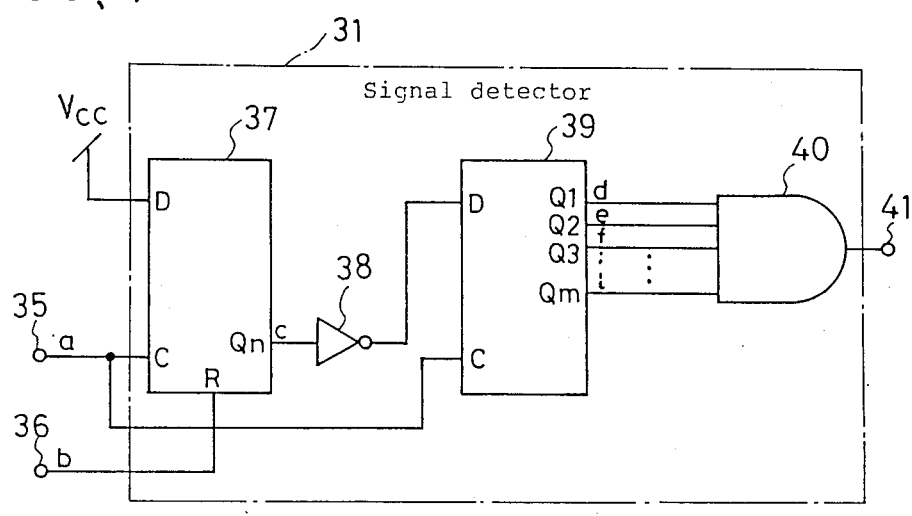
FIG. 4 is a circuit block diagram of a signal detector for use in the embodiment of the present invention.

Next, elucidation is made on the signal detector 31. FIG. 4 is a circuit diagram of a concrete embodiment of the signal detector 31. In FIG. 4, clock signal is given from a terminal 35 to a first shift register 37 and a signal to be detected is given from a terminal 36 to a reset input terminal R of the shift register 37. Output of the shift register 37 is given through an invertor 38 to an input terminal D of a second shift register 39. The clock signal from the terminal 35 is also given to the second shift register 39 through a terminal C of the latter. Output signals from output terminals Q1, Q2, Q3, ... Qm are given to respective input terminals of an AND circuit 40, and output of the AND circuit 40 is issued through a signal detection output terminal 41. Now, provided that output of the shift register 37 is taken out from n-th stage output terminal Qn of the shift register 37, and frequency of the clock signal is $f_{ck}$ and frequency of signal to be detected is $f_{si}$, the following inequity must fold:

$f_{ck} \leq nf_{si}$, $(N \geq 2)$, wherein n is an arbitrary integer which is equal to or larger than 2. But excessively large number of n makes response of the signal detector 31 slow. On the contrary, when the number n is too small, the signal detector is too much sensible for defection of signal. Accordingly, the following elucidation is made for a case of n=4 which is an appropriate value of n.

First, when there is no serious noise in the signal to be detected or there is no serious defect of the signal, the shift register 37 is rerset by inputted signal to be detected, and output becomes Low level. And after incoming of n clock pulses from releasing of the resetting, the output terminal Qn is about to become High level, but by being reset by the next incoming signal to be detected, the output terminal Qn remains always at Low level during the time period when the signal to be detected is inputted. At that time, output of the invertor 38 is at High level, and hence in stable state, and the outputs of the shift register 39 are all at High level. Accordingly, the output of the AND circuit 40 is High. When there is no incoming signal to be detected at the terminal 36, the output Qn of the shift register 37 is High in normal state, and hence the output of the AND circuit becomes Low. Thus, the signal detection is made.

Figure 5:
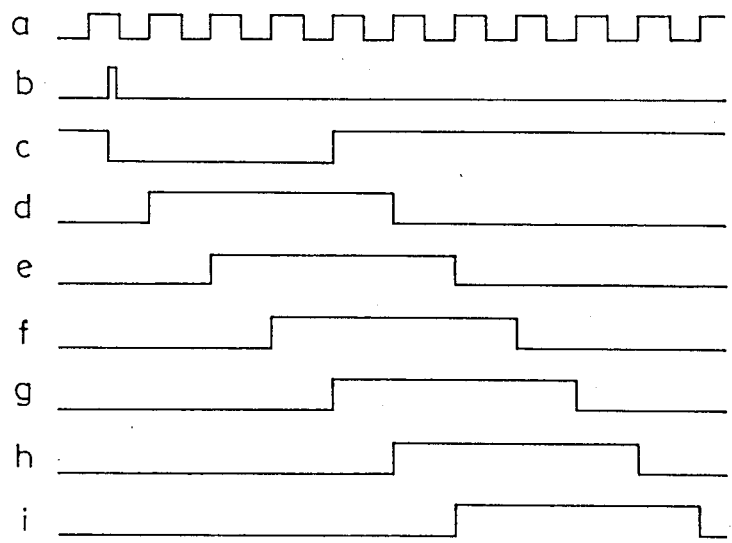
FIG. 5 and FIG. 6 are waveform charts showing waveforms of various parts of the circuit of FIG. 4.

Next, elucidation is made for a case there is no input signal to be detected, but noise comes in. FIG. 5 is a timing chart showing the operation of such case. In the chart of FIG. 5, waveform "a" shows clock signal, and "b" shows a noise coming through the input terminal 36. Waveform "c" is that of the output terminal Qn of the shift register when n=4. Waveforms "d", "e", "f", "g", "h" and "i" are signals on the output terminals Q1, Q2, Q3, . . . Qm of the shift register 39. Here, the output terminal Qm issues most delayed output signal, and m must fulfill the following condition: $m \geq n+2$.

When m is a large number, the output is hardly influenced by noise, but response as the signal detector becomes slow. One preferred example of number of m is m=6. In the waveforms of FIG. 5, when the signals d, e, . . . i, are compared, there is no period when all of the signals d through i are High. Accordingly, when logical product of all the waveforms from "d" to "i" is made by the AND circuit 40, the output of the AND circuit 40 becomes always Low, and the detected signal is not issued.

Figure 6:
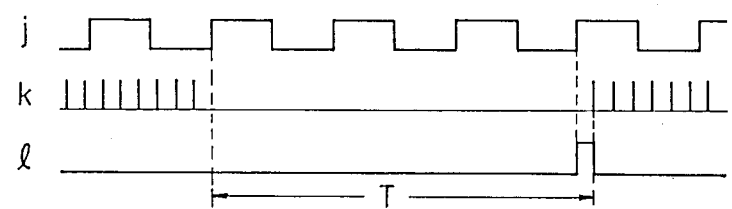

Next, a case when a signal drops out for a certain time period is elucidated. FIG. 6 is timing chart showing waves for such case. Waveform "j" shows clock signal, "k" shows signal to be detected which has the drop out and waveform "l" shows output signal of the Q4 terminal of the shift register 37. In FIG. 6, t shows a time period from a front edge of a first clock after a drop out of signal to a time when signal to be detected comes. If the time period T is within a period of n clocks, output of the shift register 39 are all High, and hence, output of the AND circuit 40 is also High. That is, the output does not receive influence of the drop out.

As is obvious, according to the signal detection circuit shown in FIG. 4, which comprises a shift register 37 which serves equivalently to the conventional analog type mono-stable multi-vibrator, a second shift register 39 for delaying output of the first shift register and the AND circuit 40 for producing logic product of the second shift register, a signal detector which is free from undesirable influence of noise or signal drop out is obtainable.

Apart from the configuration of FIG. 4, as clock signals for the shift registers 37 and 39, individual different clock signals may be used.

Furthermore, in place of the resettable shift register 37 of digital circuit, which is used as an equivalent to the analog type mono-stable multi-vibrator of the prior art, the analog type mono-stable multi-vibrator may be used of course, and furthermore, the digital circuit having the similar function may be used in place thereof.

It is a matter of course that by a combination of the signal detector shown in FIG. 4 and the synchronization signal generator of FIG. 3 as in the embodiment shown in FIG. 1, a very stable synchronization signal generator is obtainable.

As a result of the above-mentioned configuration, the synchronization signal generator in accordance with the present invention can provide stable synchronization signal which has a constant SCH phase relation, and phase of color sub-carrier always coincides with the phase of the external synchronization signal when making synchronization to the external reference signal. And on the other hand, when internal synchronization is selected, a stable synchronization without undesirable influence by noise or signal drop out is obtainable, and its industrial utility is high.

What is claimed is:

1. A synchronization signal generator comprising:
   an oscillator having an oscillation frequency of an integer times color sub-carrier frequency,
   a first counter for dividing an output signal of said oscillator to produce a color sub-carrier frequency signal,
   synchronizing means for making said oscillator synchronize with an external sub-carrier of an external reference signal,
   a second counter for dividing an output signal of said oscillator to produce horizontal and vertical synchronization signals, said second counter being coupled with a reset pulse control circuit, a horizontal information generator and a window pulse generator, said reset pulse control circuit being supplied with a horizontal information signal, an external horizontal synchronization signal and a window pulse, and operated in a manner that when said external horizontal synchronization signal exists during a period that said window pulse exists, said horizontal information signal is used as a reset pulse and when said external horizontal synchronization signal does not exist during a period that said window pulse exists, said external horizontal synchronization signal is used as a reset pulse,
   reset pulse selection means for selecting among many reset pulses produced by said reset pulse control circuit such a reset pulse of a horizontal line that has a predetermined phase relation between phase of said color sub-carrier signal issued by said first counter and said horizontal synchronization signal, and
   a normalization circuit for normalizing timing of said reset pulse selected by said reset pulse selection means, to have a relation with the phase of said color sub-carrier signal issued by said first counter, subsequently to reset said second counter.

2. A synchronization signal generator in accordance with claim 1 wherein said reset pulse selection means select reset pulses after every lapse of time period of 2n times horizontal scanning time, where n is positive integer, in NTSC system.

3. A synchronization signal generator in accordance with claim 1, wherein
said reset pulse selection means select reset pulses after every lapse of time period of 8n' times vertical scanning time, where n' is positive integer, in PAL system.

4. A synchronization signal generator in accordance with claim 1, wherein
said reset pulse selection means select reset pulses after every lapse of time period of 4n" times horizontal scanning time, where n" is positive integer, in PALM system.

5. A synchronization signal generator comprising:
an oscillator having an oscillation frequency of an integer times color sub-carrier frequency,
a first counter for dividing an output signal of said oscillator to produce a color sub-carrier frequency signal,
synchronizing means for making said oscillator synchronize with an external sub-carrier of an external reference signal,
a second counter for dividing an output signal of said oscillator to produce horizontal and vertical synchronization signals, said second counter being coupled with a reset pulse control circuit, a horizontal information generator and a window pulse generator, said reset pulse control circuit being supplied with a horizontal information signal, an external horizontal synchronization signal and a window pulse, and operated in a manner that when said external horizontal synchronization signal exists during a period that said window pulse exists, said horizontal information signal is used as a reset pulse, and when said external horizontal synchronization signal does not exist during a period that said window pulse exists, detection means detects a continuity of state of said horizontal information signal being outside said window pulse for over a predetermined time period, and said external horizontal synchronization signal is used as a reset pulse based upon a detection result of said detection means, said reset pulse being used to reset said second counter.

6. A synchronization signal generator comprising:
an oscillator having an oscillation frequency of an integer times color sub-carrier frequency,
a first counter for dividing an output signal of said oscillator to produce a color sub-carrier frequency signal,
synchronizing means for making said oscillator synchronize with an external sub-carrier of an external reference signal,
a second counter for dividing an output signal of said oscillator to produce horizontal and vertical synchronization signals, said second counter being coupled with a reset pulse control circuit, a horizontal information generator and a window pulse generator, said reset pulse control circuit being supplied with a horizontal information signal, an external horizontal synchronization signal and a window pulse, and operated in a manner that when said external horizontal synchronization signal exists during a period that said window pulse exists, said horizontal information signal is used as a reset pulse, and when said external horizontal synchronization pulse does not exist during a period that said window pulse exists, said external synchronization signal is used as a reset pulse, said reset pulse being used to reset said second counter,
a signal detector which comprises a pulse width signal generator for producing a pulse having a width of a predetermined time length from a front edge of a synchronization signal detected thereby, a delay circuit for delaying output of said pulse width signal generator, and a signal absence detector which compares states of plural outputs of said delay circuit thereby to detect presence or absence of signal and to issue a signal-absence signal to said synchronizing means, thereby to stop the synchronization operation thereof.

* * * * *